United States Patent
Kuenzner

(10) Patent No.: US 8,072,421 B2
(45) Date of Patent: Dec. 6, 2011

(54) SYSTEM AND METHOD FOR SELECTING CLEARLY DEFINED PICTURE ELEMENTS OF A DISPLAY

(75) Inventor: Hermann Kuenzner, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 609 days.

(21) Appl. No.: 12/249,076

(22) Filed: Oct. 10, 2008

(65) Prior Publication Data

US 2009/0128701 A1 May 21, 2009

Related U.S. Application Data

(63) Continuation of application No. PCT/EP2007/002112, filed on Mar. 10, 2007.

(30) Foreign Application Priority Data

Apr. 11, 2006 (DE) .......................... 10 2006 016 902

(51) Int. Cl.
G09G 5/00 (2006.01)

(52) U.S. Cl. ........ 345/156; 701/200; 345/169; 345/184; 200/11 R; 200/11 TW

(58) Field of Classification Search .......... 345/156–167, 345/169, 184; 463/37, 38; 74/471; 701/1, 701/200, 208; 340/988, 995; 200/11 R, 200/11 TW, 179, 17 B
See application file for complete search history.

(56) References Cited

U.S. PATENT DOCUMENTS

| | | | | |
|---|---|---|---|---|
| 3,737,902 A | * | 6/1973 | O'Hagan et al. | 342/41 |
| 5,270,689 A | * | 12/1993 | Hermann | 345/157 |
| 5,426,436 A | * | 6/1995 | Davis et al. | 342/182 |
| 5,945,927 A | | 8/1999 | Nakayama et al. | |
| 6,005,299 A | * | 12/1999 | Hengst | 307/10.1 |
| 6,252,602 B1 | * | 6/2001 | Matsuda et al. | 345/589 |
| 6,904,338 B2 | | 6/2005 | Weimper | |
| 6,975,932 B2 | * | 12/2005 | Obradovich | 701/96 |
| 6,983,203 B1 | | 1/2006 | Wako | |

FOREIGN PATENT DOCUMENTS

| | | |
|---|---|---|
| DE | 198 36 262 A1 | 2/2000 |
| DE | 10 2004 007 293 A1 | 9/2005 |
| EP | 0 366 132 A2 | 5/1990 |
| EP | 0 836 157 A2 | 4/1998 |
| EP | 1 262 740 A2 | 12/2002 |

OTHER PUBLICATIONS

German Search Report dated Nov. 10, 2006 with English translation of the relevant portions (Nine (9) pages).
International Search Report dated Jun. 21, 2007 with English translation of the relevant portions (Six (6) pages).

* cited by examiner

Primary Examiner — Lun-Yi Lao
Assistant Examiner — Tom Sheng
(74) Attorney, Agent, or Firm — Crowell & Moring LLP

(57) ABSTRACT

A system and method is provided for selecting clearly defined picture elements of a picture displayed in a video screen display by use of an operating element. The operating element can be rotated about its longitudinal axis. The operating element can be rotated with stop positions and controls a search beam rotatable about a center. The angle of rotation of the search beam changes with each stop position of the operating element and is variably adapted to the position of the picture elements such that the search beam hits exactly one clearly defined picture element in each stop position.

11 Claims, 1 Drawing Sheet

SYSTEM AND METHOD FOR SELECTING CLEARLY DEFINED PICTURE ELEMENTS OF A DISPLAY

CROSS-REFERENCE TO RELATED APPLICATIONS

This application is a continuation of PCT International Application No. PCT/EP2007/002112, filed Mar. 10, 2007, which claims priority under 35 U.S.C. §119 to German Application No. 10 2006 016 902.6, filed Apr. 11, 2006, the entire disclosures of which are expressly incorporated by reference herein.

BACKGROUND AND SUMMARY OF THE INVENTION

The invention relates to a system and method for selecting clearly defined picture elements of a picture displayed in a video screen display by use of an operating element that is rotatable rotated about its longitudinal axis.

For this purpose, it is basically contemplated to provide a "search beam" and to move the latter by way of the operating element to the respectively desired picture element. This may be difficult, for example, when only a few picture elements are present in the picture on the video display and may lead to long moving paths and durations.

It is an object of the invention to provide a system and method which permits rapid and reliable movement to clearly defined picture elements of a display.

The invention achieves this object by a system and method for selecting clearly defined picture elements of a picture displayed in a video screen display by use of an operating element that can be rotated about its longitudinal axis. The operating element can be rotated with stop positions. The operating element controls a search beam rotatable about a center, whose angle of rotation changes with each stop position. The angle of rotation is variably adapted to the position of the picture elements such that the search beam hits exactly one clearly defined picture element in each stop position.

As a rule, the operating element is rotatable and includes stop positions. By use of a search beam, which can be rotated about a center, and its angle-of-rotation change adapted to the position of the clearly defined picture elements, the angle of rotation can be variably adapted to the position of the picture elements such that the search beam hits precisely one clearly defined picture element in every stop position.

A movement to precisely one picture element takes place per stop position of the operating element. When the respective picture element is hit by the search beam, additional information of the respective picture element can be illustrated on the video screen. This can automatically take place, for example, after a defined time of several seconds if the search beam stays on the respective picture element, or can be initiated by an axial movement of the operating element.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
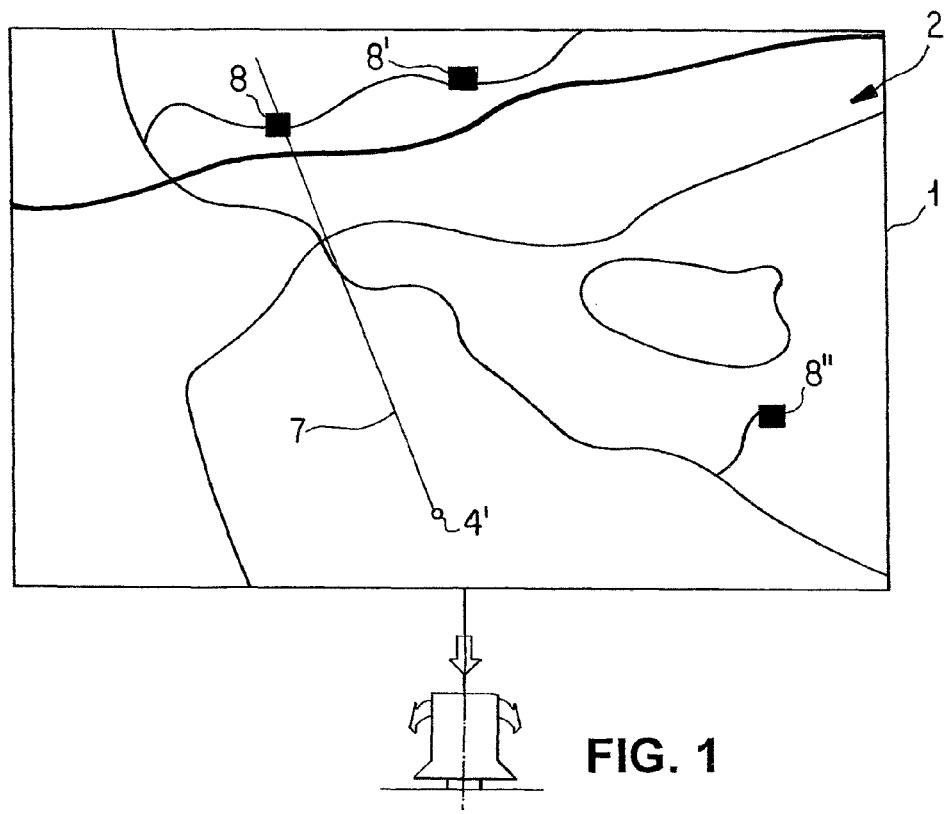
FIG. 1 is a view of an embodiment of the invention in a first condition.

FIG. 1 is a basic view of a video display provided within the scope of the invention. Within a display area 1, which is equal to the image area of a video screen, a picture of a map cutout 2 and, therein, several clearly defined picture elements 8, 8', 8", etc. are situated. The operating element is a rotary-push button, as known from European patent document 0 366 132 B1.

In order to move to the picture elements 8, 8', 8", etc., a separate operating mode may be provided for this purpose, which is selected within the scope of a menu control (not shown) to be carried out by the operating element. As an alternative, for adjusting the operating mode, the operating element can, in addition, be deflected about its base starting from its vertically aligned initial position.

In addition, in each of the two cases, the angle of rotation of the operating element should be adjustable in a catch-type manner.

In the special operating mode, a search beam 7 starting from a center 4', is changed in its angle of rotation by the operating element.

The search beam 7 is shaped in the manner of a directional vector, which is rotatable about the center 4' and whose angle of rotation is changed with every stop position of the operating element. If several objects are provided within the map cutout 2, the angle of rotation of the search beam 7 is variably adapted to the position of the picture elements such that, in each stop position, the search beam hits precisely one clearly defined picture element; that is, with each stop position of the operating element, the search beam is switched to another special picture element on the map. This is useful, for example, for identifying POIs (points of interest) such as gas stations or the like.

The center 4' may be situated in the middle of the map cutout or, for example, at the lower edge of the cutout.

Figure 2:
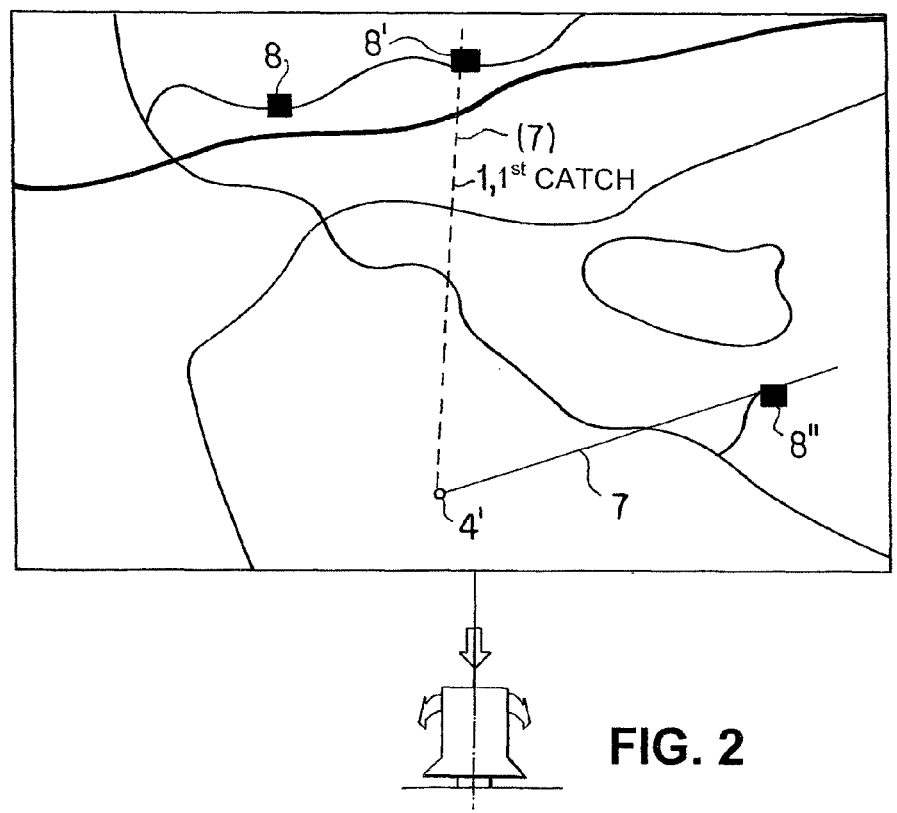
FIG. 2 is a view of a pertaining second condition.

Starting from the initial position illustrated in FIG. 1, in which the search beam 7 as such "hits" the square 8, additional objects of the map cutout 2 (here shown as squares marked 8' and 8") can be "hit" successively or directly in that the operating element is, in each case, rotated to the right about one stop position. FIG. 2 shows the search beam on picture element 8" after the operating element had been rotated clockwise precisely by two stop positions.

The starting picture element for the search beam when adjusting the operating mode may be arbitrary, for example, at the picture element last selected in a preceding operating phase, or at the picture element which is arranged as much as possible in the center or the farthest to the left or to the right.

The movement of the operating element may, as required, be bounded by mechanical catches. Likewise, it is contemplated to limit the diagonal angle, at which the search beam 7 is moving, by a corresponding method of operation of the software which carries out the implementation of the control commands issued by the operating element into corresponding movements of the search beam.

The diagonal angle of the search beam movement can also be changed in a catch-type manner up to the maximal value. A continued movement of the operating element will then not have any effect; that is, the search beam will then no longer be moving. When the operating element moves in the opposite direction, the search beam can immediately be rotated in the opposite direction again.

Finally, as known per se, the operating element may be axially movable and, during an axial movement of the operating element, information can be displayed which is assigned to the respective picture element hit by the search beam. This, for example, is information concerning the location symbolized by the square 8.

In this manner, it becomes possible to rapidly and reliably move to different picture elements within a map cutout.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for selecting defined picture elements of a displayed image, the system comprising:
    an operating element rotatable about is longitudinal axis and including stop positions;
    a display for displaying the image, the display being operatively coupled with the operating element; and
    wherein the operating element controls a search beam on the display that is rotatable about a center, an angle of rotation of the search beam changing with each stop position of the operating element; and
    wherein the angle of rotation of the search beam is variably adapted to positions of the picture elements such that the search beam aligns with exactly one defined picture element upon movement of the operating element to a stop position.

2. The system according to claim 1, wherein the operating element controls the search beam after the operating element has carried out a transverse movement in a preparatory manner.

3. The system according to claim 2, wherein the transverse movement is a tilting motion.

4. The system according to claim 3, wherein the operating element is restrictedly guided for the transverse movement.

5. The system according to claim 2, wherein the operating element is restrictedly guided for the transverse movement.

6. The system according to claim 1, wherein the operating element controls the search beam, after a corresponding operating mode was set in a preparatory manner.

7. The system according to claim 1, wherein the operating element is axially movable, and further wherein, in the case of an axial movement of the operating element, information assigned to the hit picture element can be displayed.

8. A method for selecting defined picture elements of an image displayed in a display screen using a search beam on the display screen, the method comprising the acts of:
    controlling the search beam, which is rotatable about a center point, using an operating element rotatable about its longitudinal axis and having stop positions, an angle of rotation of the search beam being changeable upon rotating the operating element to a stop position;
    variably adapting the angle of rotation of the search beam such that the search beam exactly aligns with only one defined picture element in the image on the display screen upon rotating the operating element to a new stop position.

9. The method according to claim 8, further comprising the act of performing a transverse movement of the operating element to initiate the control of the search beam via the operating element.

10. The method according to claim 9, further comprising the act of axially moving the operating element in order to cause information concerning the picture element aligned with the search beam to be displayed.

11. The method according to claim 8, further comprising the act of axially moving the operating element in order to cause information concerning the picture element aligned with the search beam to be displayed.

* * * * *